(12) United States Patent
Albasha et al.

(10) Patent No.: US 12,561,369 B2
(45) Date of Patent: Feb. 24, 2026

(54) METADATA FOR GRAPH CONNECTED DATABASES

(71) Applicant: Dell Products L.P., Round Rock, TX (US)

(72) Inventors: Mustafa M. Albasha, Round Rock, TX (US); Michael Shepherd, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/581,531

(22) Filed: Jan. 21, 2022

(65) Prior Publication Data

US 2023/0237095 A1 Jul. 27, 2023

(51) Int. Cl.
*G06F 16/901* (2019.01)
*G06F 16/21* (2019.01)

(52) U.S. Cl.
CPC ........ *G06F 16/9024* (2019.01); *G06F 16/213* (2019.01)

(58) Field of Classification Search
CPC ............... G06F 16/9024; G06F 16/213; G06F 16/3328; G06F 16/532
See application file for complete search history.

(56) References Cited

U.S. PATENT DOCUMENTS

| | | | |
|---|---|---|---|
| 7,380,271 | B2 | 5/2008 | Moran et al. |
| 7,969,995 | B2 | 6/2011 | Collins et al. |

| | | | |
|---|---|---|---|
| 8,997,091 | B1 | 3/2015 | Watson et al. |
| 10,664,498 | B2 | 5/2020 | Sloane et al. |
| 11,093,499 | B2 | 8/2021 | Kadiam et al. |
| 11,449,372 | B1 | 9/2022 | Chavis et al. |
| 11,734,236 | B1 | 8/2023 | Erickson et al. |

(Continued)

FOREIGN PATENT DOCUMENTS

| | | |
|---|---|---|
| CN | 109918386 A | 6/2019 |
| CN | 109918386 B | 4/2021 |
| CN | 115879120 A | 3/2023 |

OTHER PUBLICATIONS

Albasha et al. "Access Control Framework For Graph Entities" U.S. Appl. No. 17/581,554, filed Jan. 21, 2022, 46 pages.

(Continued)

*Primary Examiner* — Amy Ng
*Assistant Examiner* — Dustin D Eyers
(74) *Attorney, Agent, or Firm* — Amin, Turocy & Watson, LLP

(57) ABSTRACT

A system can present a first graph visual representation of data of a first database in a first user interface. The system can receive user data at the first user interface that is indicative of interacting with the first graph visual representation of the data. The system can determine graph metadata for the data of the first database from the user data. The system can store the graph metadata in a second database, wherein the first database is separate from the second database. The system can determine a second graph visual representation that comprises a combination of the data of the first database and the graph metadata of the second database. The system can present the second graph visual representation in a second user interface, wherein the second user interface comprises the first user interface or another user interface other than the first user interface.

20 Claims, 10 Drawing Sheets

100

METADATA FOR GRAPH CONNECTED DATABASES SYSTEM 106

DATABASE 1 108

METADATA FOR GRAPH CONNECTED DATABASES COMPONENT 110

DATABASE 2 112

COMMUNICATIONS NETWORK 104

USER COMPUTER 102

(56)          References Cited

U.S. PATENT DOCUMENTS

| | | | |
|---|---|---|---|
| 2006/0277224 A1 | 12/2006 | Aftab et al. | |
| 2009/0313331 A1* | 12/2009 | Rasmussen | G06F 40/197 |
| | | | 709/205 |
| 2011/0145748 A1* | 6/2011 | Farver | G06F 8/71 |
| | | | 715/771 |
| 2012/0036162 A1 | 2/2012 | Gimbel | |
| 2012/0209886 A1 | 8/2012 | Henderson | |
| 2013/0023247 A1* | 1/2013 | Bolon | H04W 4/029 |
| | | | 455/414.1 |
| 2016/0203327 A1 | 7/2016 | Akkiraju et al. | |
| 2016/0253364 A1* | 9/2016 | Gomadam | G06F 16/9024 |
| | | | 707/739 |
| 2017/0018034 A1* | 1/2017 | Wainman | G06Q 40/12 |
| 2017/0221240 A1* | 8/2017 | Stetson | G06T 11/206 |
| 2018/0349368 A1* | 12/2018 | Bellingham | G06F 16/164 |
| 2019/0196890 A1* | 6/2019 | Bucchi | G06F 16/951 |
| 2020/0104379 A1* | 4/2020 | Wada | G06F 16/221 |
| 2021/0112071 A1 | 4/2021 | Chen | |
| 2021/0149893 A1* | 5/2021 | Sehgal | G06N 5/022 |
| 2021/0312547 A1* | 10/2021 | Ding | G06F 16/2379 |

OTHER PUBLICATIONS

Office Action mailed May 20, 2024 for U.S. Appl. No. 17/581,554, 47 pages.

Office Action mailed Jan. 25, 2024 for U.S. Appl. No. 17/581,554, 61 pages.

Office Action mailed Jan. 17, 2025 for U.S. Appl. No. 17/581,554, 110 pages.

Office Action mailed Jul. 1, 2025 for U.S. Appl. No. 17/581,554, 141 pages.

* cited by examiner

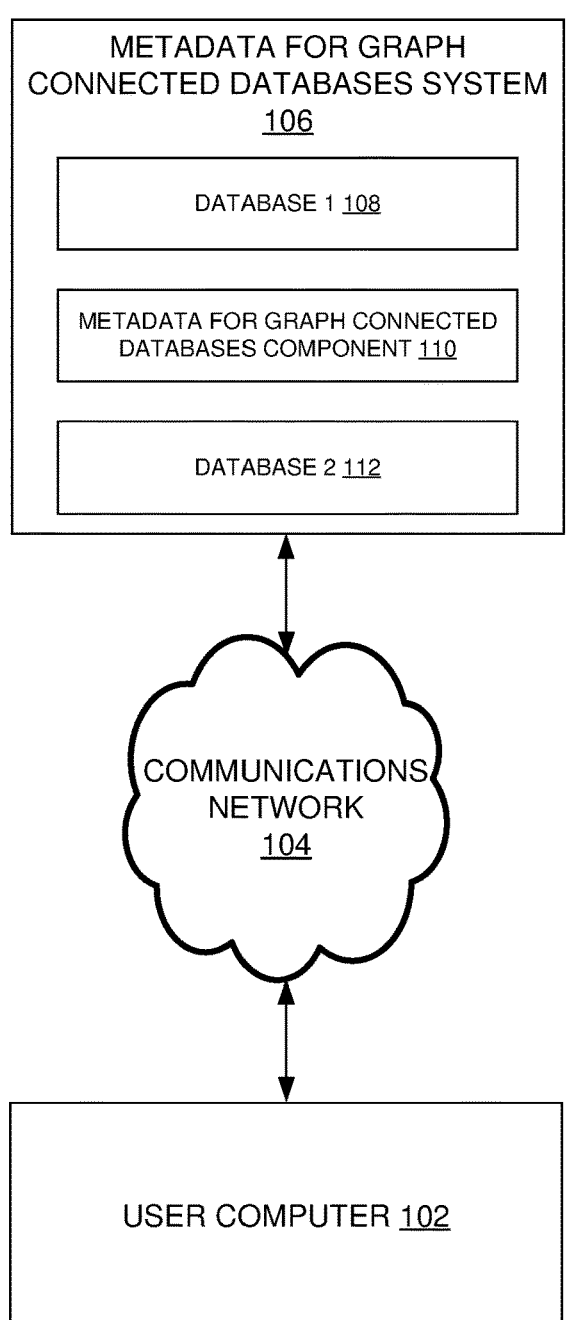
FIG. 1

200

300
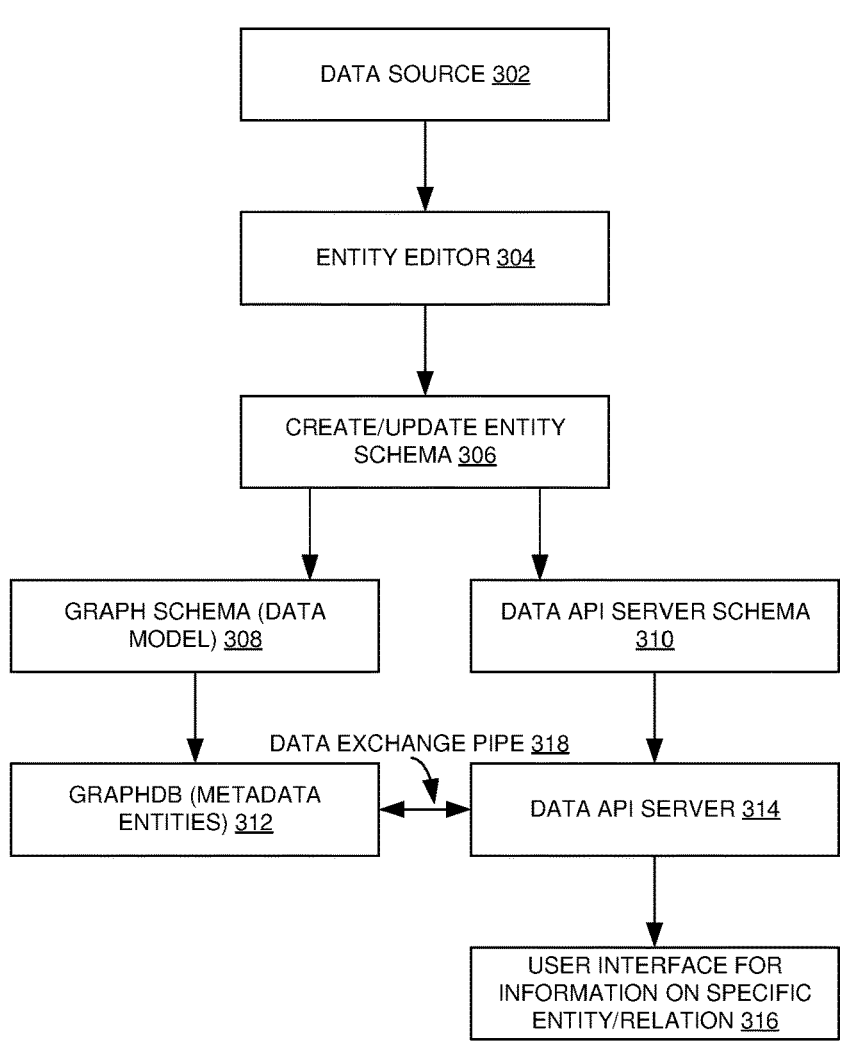
DATA SOURCE 302
ENTITY EDITOR 304
CREATE/UPDATE ENTITY SCHEMA 306
GRAPH SCHEMA (DATA MODEL) 308
DATA API SERVER SCHEMA 310
DATA EXCHANGE PIPE 318
GRAPHDB (METADATA ENTITIES) 312
DATA API SERVER 314
USER INTERFACE FOR INFORMATION ON SPECIFIC ENTITY/RELATION 316
FIG. 3

400

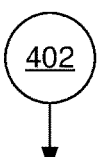

PRESENTING A FIRST GRAPH VISUAL REPRESENTATION OF DATA OF A FIRST DATABASE IN A FIRST USER INTERFACE 404

RECEIVING USER DATA AT THE FIRST USER INTERFACE THAT IS INDICATIVE OF INTERACTING WITH THE FIRST GRAPH VISUAL REPRESENTATION OF THE DATA 406

DETERMINING GRAPH METADATA FOR THE DATA OF THE FIRST DATABASE FROM THE USER DATA 408

STORING THE GRAPH METADATA IN A SECOND DATABASE, WHEREIN THE FIRST DATABASE IS SEPARATE FROM THE SECOND DATABASE 410

DETERMINING A SECOND GRAPH VISUAL REPRESENTATION THAT COMPRISES A COMBINATION OF THE DATA OF THE FIRST DATABASE AND THE GRAPH METADATA OF THE SECOND DATABASE 412

PRESENTING THE SECOND GRAPH VISUAL REPRESENTATION IN A SECOND USER INTERFACE, WHEREIN THE SECOND USER INTERFACE COMPRISES THE FIRST USER INTERFACE OR ANOTHER USER INTERFACE OTHER THAN THE FIRST USER INTERFACE 414

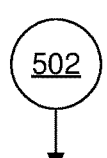

502

RECEIVING USER DATA AT A FIRST USER INTERFACE THAT IS INDICATIVE OF INTERACTING WITH A FIRST GRAPH VISUAL REPRESENTATION OF DATA OF A FIRST DATA STORE, WHEREIN THE FIRST GRAPH VISUAL REPRESENTATION IS PRESENTED IN THE FIRST USER INTERFACE 504

DETERMINING GRAPH METADATA FOR THE DATA OF THE FIRST DATA STORE FROM THE USER DATA 506

STORING THE GRAPH METADATA IN A SECOND DATA STORE 508

DETERMINING A SECOND GRAPH VISUAL REPRESENTATION THAT COMPRISES A COMBINATION OF THE DATA OF THE FIRST DATA STORE AND THE GRAPH METADATA OF THE SECOND DATA STORE 510

PRESENTING THE SECOND GRAPH VISUAL REPRESENTATION IN A SECOND USER INTERFACE, WHEREIN THE SECOND USER INTERFACE COMPRISES THE FIRST USER INTERFACE OR ANOTHER USER INTERFACE OTHER THAN THE FIRST USER INTERFACE 512

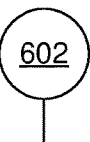

602

RECEIVING USER DATA AT A FIRST USER INTERFACE THAT IS INDICATIVE OF INTERACTING WITH A FIRST GRAPH VISUAL REPRESENTATION OF DATA OF A FIRST DATABASE, WHEREIN THE FIRST GRAPH VISUAL REPRESENTATION IS PRESENTED IN THE FIRST USER INTERFACE 604

STORING GRAPH METADATA IN A SECOND DATABASE, WHEREIN THE GRAPH METADATA IS DETERMINED FROM THE USER DATA, AND WHEREIN THE GRAPH METADATA CORRESPONDS TO GRAPH METADATA OF THE FIRST DATABASE 606

DETERMINING A SECOND GRAPH VISUAL REPRESENTATION THAT COMPRISES A COMBINATION OF THE DATA OF THE FIRST DATABASE AND THE GRAPH METADATA OF THE SECOND DATABASE 608

PRESENTING THE SECOND GRAPH VISUAL REPRESENTATION IN A SECOND USER INTERFACE, WHEREIN THE SECOND USER INTERFACE COMPRISES THE FIRST USER INTERFACE OR ANOTHER USER INTERFACE 610

700
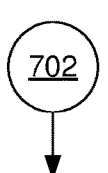
702
IN RESPONSE TO RECEIVING USER DATA INDICATIVE OF EDITING AN ENTITY OF THE DATA, UPDATING AN ENTITY NESTED SCHEMA MODEL OF A FIRST DATABASE BASED ON THE USER DATA 704
UPDATING AN ANTHOLOGICAL SCHEMA MODEL FOR A SECOND DATABASE BASED ON THE SECOND USER DATA 706
708
FIG. 7

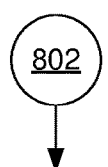
CREATING AN ANTHOLOGICAL SCHEMA MODEL FOR A SECOND DATABASE, WHEREIN THE ANTHOLOGICAL SCHEMA MODEL IDENTIFIES DATA ENTITIES OF A FIRST DATABASE AND RELATIONS BETWEEN RESPECTIVE DATA ENTRIES OF THE FIRST DATABASE 804
STORING THE GRAPH METADATA IN THE SECOND DATABASE ACCORDING TO THE ANTHOLOGICAL SCHEMA MODEL 806
FIG. 8

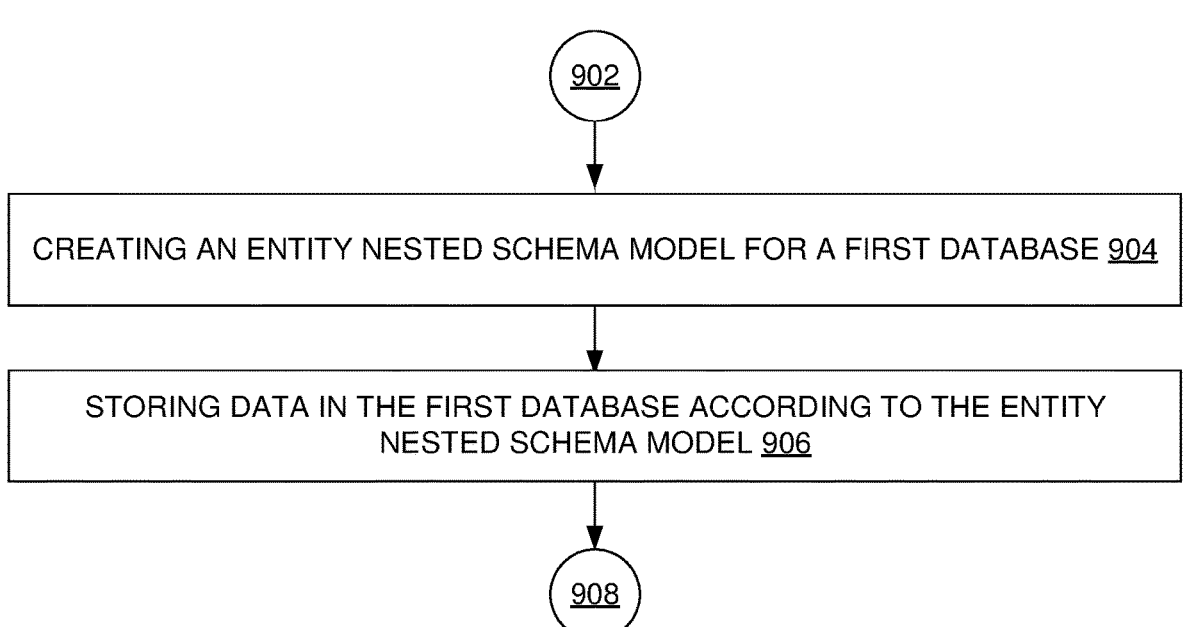
FIG. 9

1000

METADATA FOR GRAPH CONNECTED DATABASES

BACKGROUND

A graph database can comprise a form of a relational database. A graph can comprise nodes and edges that connect nodes. A graph database can associate data in a database with nodes in a graph, and relationships between the data in the database with edges in the graph.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can present a first graph visual representation of data of a first database in a first user interface. The system can receive user data at the first user interface that is indicative of interacting with the first graph visual representation of the data. The system can determine graph metadata for the data of the first database from the user data. The system can store the graph metadata in a second database, wherein the first database is separate from the second database. The system can determine a second graph visual representation that comprises a combination of the data of the first database and the graph metadata of the second database. The system can present the second graph visual representation in a second user interface, wherein the second user interface comprises the first user interface or another user interface other than the first user interface.

A method can comprise receiving, by a system comprising a processor, user data at a first user interface that is indicative of interacting with a first graph visual representation of data of a first data store, wherein the first graph visual representation is presented in the first user interface. The method can comprise determining, by the system, graph metadata for the data of the first data store from the user date. The method can comprise storing, by the system, the graph metadata in a second data store. The method can comprise determining, by the system, a second graph visual representation that comprises a combination of the data of the first data store and the graph metadata of the second data store. The method can comprise presenting, by the system, the second graph visual representation in a second user interface, wherein the second user interface comprises the first user interface or another user interface other than the first user interface.

An example non-transitory computer-readable medium can comprise instructions that, in response to execution, cause a system comprising a processor to perform operations. These operations can comprise receiving user data at a first user interface that is indicative of interacting with a first graph visual representation of data of a first database, wherein the first graph visual representation is presented in the first user interface. These operations can further comprise storing graph metadata in a second database, wherein the graph metadata is determined from the user data, and wherein the graph metadata corresponds to graph metadata of the first database. These operations can further comprise determining a second graph visual representation that comprises a combination of the data of the first database and the graph metadata of the second database. These operations can further comprise presenting the second graph visual representation in a second user interface, wherein the second user interface comprises the first user interface or another user interface.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate metadata for graph connected databases, in accordance with an embodiment of this disclosure;

FIG. 3 illustrates another example system architecture that can facilitate metadata for graph connected databases, in accordance with an embodiment of this disclosure;

FIG. 4 illustrates an example process flow that can facilitate metadata for graph connected databases, in accordance with an embodiment of this disclosure;

FIG. 5 illustrates another example process flow that can facilitate metadata for graph connected databases, in accordance with an embodiment of this disclosure;

FIG. 6 illustrates another example process flow that can facilitate metadata for graph connected databases, in accordance with an embodiment of this disclosure;

FIG. 7 illustrates another example process flow that can facilitate metadata for graph connected databases, in accordance with an embodiment of this disclosure;

FIG. 8 illustrates another example process flow that can facilitate metadata for graph connected databases, in accordance with an embodiment of this disclosure;

FIG. 9 illustrates another example process flow that can facilitate metadata for graph connected databases, in accordance with an embodiment of this disclosure;

DETAILED DESCRIPTION

Overview

Figure 2:
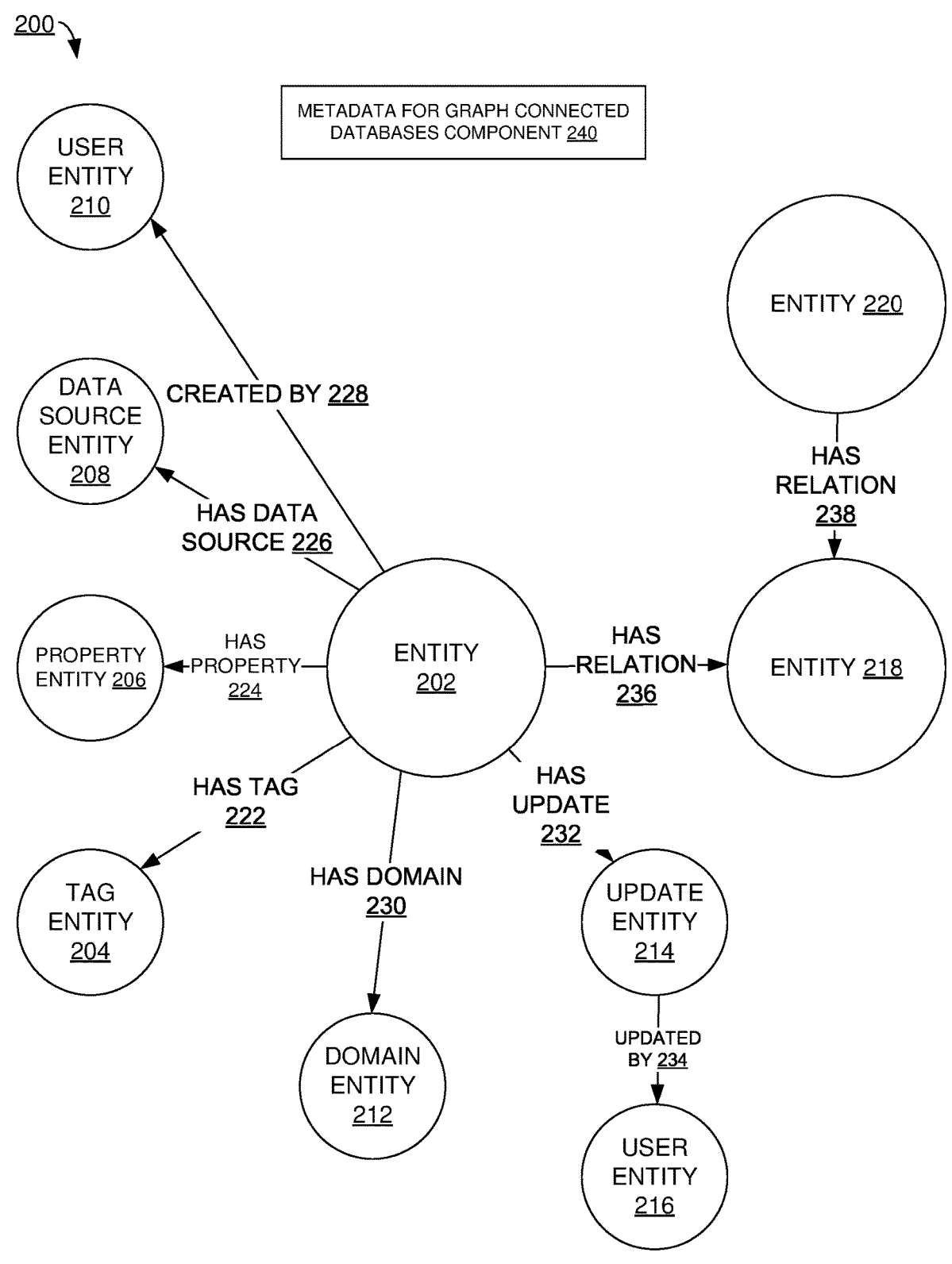
FIG. 2 illustrates another example system architecture that can facilitate metadata for graph connected databases, in accordance with an embodiment of this disclosure.

While the examples described herein generally involve graph databases and metadata, it can be appreciated that the present techniques can be applied to other types of databases and metadata.

It can be that only a small amount of data generated is being analyzed. With an acceleration of data management, there can be a focus on developing multiple architectural aspects to overcome some of the barriers to analyzing data. As silo'd data is reduced, techniques can be implemented to explore, solve, and orchestrate approaches to bringing silo'd data ecosystems together, as well as to provide better user experiences.

The present techniques can provide new approaches for unifying disparate data sets, such as telemetry and business data, as well as creating an ecosystem that can accelerate worker productivity.

The present techniques can be implemented to leverage metadata created by users by interfacing with a graph database. That is, the present techniques can capture a form of clickstream data from users creating, updating, exploring, and using a graph database, along with additional security elements and opportunities. The present techniques can provide for a user experience and interface that empower information technology (IT) and security to monitor and control user access to a database, as well as provide a secondary output for value add back to the user itself. For example, a data scientist can be collaborating on a project, and thus can want to explore all data a coworker is using to build an artificial intelligence (AI) model for a project. A simple search of metadata, according to the present techniques, can facilitate visualizing this.

Prior approaches lack an application and user interface that can agnostically navigate metadata from a graph dataset with filters for exploring ontological (e.g., a system of categories that classifies entities) interconnected domains of the metadata itself. Some prior approaches can implement metadata collection systems, but they lack many user interface domains and frameworks according to the present techniques.

A problem with prior approaches can be an inability for a user to understand consumed data entities and associated interrelationships in a database. Another problem with prior approaches can be that existing graph database platforms, while they can serve data and provide a general description of the data, lack a systematic and agnostic way (e.g., techniques that can be applied to multiple types of databases that store data in different ways) for users to understand data entities and interrelationships.

A user interface according to the present techniques can provide for interfacing and exploring both relationships across enterprise scale knowledge graphs, and ontological relationships of a graph's metadata. The present techniques can facilitate an agnostic an automated system to create and update data entities metadata from utilization of a graph, as well as a user experience that exposes a navigable user interface for metadata and its data entities.

An anthological schema model (e.g., one that can store a collection of data entities and relations for a graph) can be created in the graph database that describes data entities and relations, and how they are interconnected. This schema can be stored in a graph database. Then, an entity-nested data application programming interface (API) server schema and resolvers can be created to enable consumption of the entity information. This can create a contract between the front end and the GraphDB that the front components can utilize.

The present techniques can be implemented to provide a framework for collecting, tagging, and storing metadata of users in a separate graph, so information technology, security, data scientists, and others can explore the metadata and its relationships by traversing from node to node.

The present techniques can be implemented to provide a data agnostic pipeline that automates schema and data exchange between a data API server and a GraphDB of metadata.

The present techniques can be implemented to provide a framework that connects metadata to an agnostic user interface.

The present techniques can be implemented to store metadata for a graph database, regardless of the specific implementation of that graph database. In that sense, the techniques are agnostic. The graph database can be a first database, and metadata for a graph database can be stored in a second database. The schema of the metadata database can be defined to account for the nodes and edges (sometimes referred to as relations) of the graph database. Then, when metadata is created for a particular entity of the graph database, it can be stored in a portion of the metadata database that corresponds to that entity. As a user interacts with the graph database, metadata can be generated and stored (e.g., an identity of the user and a time at which an entity was updated, or a data source from which an entity was created).

The data entity referred to can comprise a data node and/or relationship data between data nodes. A data node entity can comprise a single or multiple properties. A data relationship entity can comprise a single or multiple properties.

Example Architectures

FIG. 1 illustrates an example system architecture 100 that can facilitate metadata for graph connected databases, in accordance with an embodiment of this disclosure.

As depicted, system architecture 100 comprises user computer 102, communications network 104, and metadata for graph connected databases system 106. In turn, metadata for graph connected databases system 106 comprises database 1 108, metadata for graph connected databases component 110, and database 2 112.

Figure 10:
FIG. 10 illustrates an example block diagram of a computer operable to execute an embodiment of this disclosure.

Each of user computer 102 and metadata for graph connected databases system 106 can be implemented with part(s) of computing environment 1000 of FIG. 10. Communications network 104 can comprise a computer communications network, such as the Internet.

In some examples, metadata for graph connected databases component 110 can implement part(s) of the process flows of FIGS. 4-9 to facilitate metadata for graph connected databases.

User computer 102 can communicate with metadata for graph connected databases system 106 via communications network 104 to access data in database 1 108. Metadata for graph connected databases component 110 can generate and provide a user interface to user computer 102 that presents information in database 1 108. As user computer 102 accesses the data via the user interface, metadata can be generated, such as an identification of which user account created an entity. This metadata can be stored in database 2 112.

A schema of database 2 112 can be created based on the entities and relationships of database 1 108. In this manner, database 1 108 and database 2 112 can be agnostically linked (e.g., linked regardless of what schema is used in database 1 108). As metadata for database 1 108 is created, this metadata can be stored in database 2 112.

It can be appreciated that system architecture 100 is one example system architecture for extracting facial imagery from online sessions, and that there can be other system architectures that facilitate extracting facial imagery from online sessions.

FIG. 2 illustrates another example system architecture 200 that can facilitate metadata for graph connected databases, in accordance with an embodiment of this disclosure. In some examples, system architecture 200 can be a representation of a graph database from one database and metadata from another database, such as where metadata for graph connected databases component 110 can combine information from database 1 108 and database 2 112.

System architecture 200 comprises entity 202, entity 204, entity 206, entity 208, entity 210, entity 212, entity 214, entity 216, entity 218, entity 220, relation 222, relation 224, relation 226, relation 228, relation 230, relation 232, relation 234, relation 236, and relation 238.

Entity 202 can comprise a data entity from database 1 108. Information about entity 202 that can be stored includes a category label (which can be a string), a description (which can be a string), tags (which can be an array of strings), a type (which can be a string), and a note (which can be a string that indicates a note that the type can be a "node" or a "relation").

Entity 204 is connected to entity 202 via relation 222. Relation 222 indicates that entity 202 has a tag, which is stored as entity 204. Entity 204 can store a name (which can be a string) and a description (which can be a string) for the tag.

Entity 206 is connected to entity 202 via relation 224. Relation 224 indicates that entity 202 has a property, which is stored as entity 206. Entity 206 can store a description (which can be a string), a name (which can be a string), and a type (Which can be a string) of the property.

Entity 208 is connected to entity 202 via relation 226. Relation 226 indicates that entity 202 has a data source, which is stored as entity 208. Entity 208 can store a description (which can be a string), a source property name (which can be a string), a type (which can be a string), a database (which can be a string), and a record name (which can be a string) of the data source.

Entity 210 is connected to entity 202 via relation 228. Relation 228 indicates that entity 202 was created by a user (and can include a date of creation), which is stored as entity 210. Entity 210 can store a user name (which can be a string), a first name (which can be a string), and a last name (which can be a string) of the user that created entity 202.

Entity 212 is connected to entity 202 via relation 230. Relation 230 indicates that entity 202 is part of a particular domain, which is stored as entity 212. Entity 212 can store a name (which can be a string) of the domain.

Entity 214 is connected to entity 202 via relation 232. Relation 232 indicates that entity 202 was updated and can include a date of update. Entity 214 can store a user name (which can be a string), a first name (which can be a string), a last name (which can be a string), and a type (which can be a string) of the updater and the update.

Entity 216 is connected to entity 214 via relation 234. Relation 234 indicates that the update of entity 214 was performed by a particular user, which is stored as entity 216.

Entity 218 is connected to entity 202 via relation 236. Relation 236 indicates that entity 202 and entity 218 are related. Like entity 202, entity 218 can comprise a data entity from database 1 108. Information about entity 218 that can be stored includes a category label (which can be a string), a description (which can be a string), tags (which can be an array of strings), a type (which can be a string), a source (which can be a string that indicates an asset), and a destination (which can be a string that indicates a particular hard drive).

Entity 220 is connected to entity 218 via relation 238. Relation 238 indicates that entity 218 and entity 220 are related. Information about entity 220 that can be stored includes a category label (which can be a string), a description (which can be a string), tags (which can be an array of strings), a type (which can be a string), a source (which can be a string), and a destination (which can be a string).

In some examples, data for entity 202, entity 218, entity 220, relation 236 and relation 238 can be stored in database 1 108 of FIG. 1. In some examples, the other information in this graph, which generally comprises metadata for the data in database 1 108 of FIG. 1—e.g., entity 204, entity 206, entity 208, entity 210, entity 212, entity 214, entity 216, relation 222, relation 224, relation 226, relation 228, relation 230, relation 232, and relation 234—can be stored in database 2 112. Metadata for graph connected databases component 240 (which can be similar to metadata for graph connected databases component 110) can synthesize this information in the two databases to present this graph to a user in a user interface.

FIG. 3 illustrates another example system architecture 300 that can facilitate metadata for graph connected databases, in accordance with an embodiment of this disclosure. In some examples, part(s) of system architecture 300 can be used to implement metadata for graph connected databases component 110 of FIG. 1.

System architecture 300 comprises data source 302, entity editor (user) 304, create/update entity schema 306, graph schema (data model) 308, data API server schema 310, GraphDB (metadata entities) 312, data API server 314, and user interface for information on specific entity/relation 316.

Data source 302 can provide data to be stored as a graph database, and can contain a source entity that can be edited at entity editor (user) 204. A result of editing the entity can be processed by create/update entity schema 306, which can update a schema for both graph 1 database 108 and graph 2 database 112.

Graph schema (data model) 308 can store a schema for metadata of the graph data stored in graph 1 database 108, and can be used as a schema for graph 2 database 112. For example, where a new entity is added to graph 1 database 108, the schema for graph 2 database 112 can be updated to include storing metadata about this new entity. Data API server schema 310 can be updated to store the new entity.

GraphDB (metadata entities) 312 can be similar to graph 2 database 112 and can use the schema of graph schema (data model) 308. Data API server 314 can be similar to graph 1 database 108 and can use the schema of data API server schema 310. GraphDB (metadata entities) 312 and data API server 314 can be connected via data exchange pipe 318.

Data API server 314 can provide information to a user that is presented in user interface for information on specific entity/relation 316. As data is received that is indicative of user input interacting with the user interface (e.g., accessing or creating a node or entity), this information can be processed as metadata, and stored in GraphDB (metadata entities).

Example Process Flows

FIG. 4 illustrates an example process flow 400 that can facilitate metadata for graph connected databases, in accordance with an embodiment of this disclosure. In some examples, one or more embodiments of process flow 400 can be implemented by metadata for graph connected databases component 110 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, and/or process flow 900 of FIG. 9.

Process flow 400 begins with 402, and moves to operation 404. Operation 404 depicts presenting a first graph visual representation of data of a first database in a first user interface. That is, a user can be presented with a graph in a user interface, where the information in the graph is stored in a data API server database.

After operation 404, process flow 400 moves to operation 406.

Operation 406 depicts receiving user data at the first user interface that is indicative of interacting with the first graph visual representation of the data. That is, the user can interact with the graph via the user interface, such as by accessing, creating, or editing an entity in the graph.

In some examples, the user data at the first user interface that is indicative of interacting with the first graph visual representation comprises user data indicative of creating an entry the data, updating the entry in the data, or exploring the data, and wherein the entry comprises a node or an edge that connects two nodes. That is, the user can be presented with data and can interact with that data in some manner, such as by creating or updating an entity, or exploring nodes and edges (sometimes referred to as relations) that already exist without updating them.

After operation 406, process flow 400 moves to operation 408.

Operation 408 depicts determining graph metadata for the data of the first database from the user data. That is, the user interaction in operation 406 can be used to generate metadata about the graph.

After operation 408, process flow 400 moves to operation 410.

Operation 410 depicts storing the graph metadata in a second database, wherein the first database is separate from the second database. That is, this metadata can be stored in a different database than the database used to generate the graph, such as a GraphDB database.

In some examples, the first database is configured to be accessed via a first protocol for querying and manipulating data, wherein the second database is configured to be accessed via a second protocol, and wherein the first protocol differs from the second protocol. That is, the two databases can be similar to database 1 108 and database 2 112 of FIG. 1, respectively.

After operation 410, process flow 400 moves to operation 412.

Operation 412 depicts determining a second graph visual representation that comprises a combination of the data of the first database and the graph metadata of the second database. That is, a new user interface can be created (which can be an update to the information presented in the user interface of operation 404), and this new user interface can be created based on information stored in both databases.

After operation 412, process flow 400 moves to operation 414.

Operation 414 depicts presenting the second graph visual representation in a second user interface, wherein the second user interface comprises the first user interface or another user interface other than the first user interface. That is, the new user interface of operation 412 can be presented to a user.

After operation 406, process flow 400 moves to 416, where process flow 400 ends.

FIG. 5 illustrates another example process flow 500 that can facilitate metadata for graph connected databases, in accordance with an embodiment of this disclosure. In some examples, one or more embodiments of process flow 500 can be implemented by metadata for graph connected databases component 110 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, and/or process flow 900 of FIG. 9.

Process flow 500 begins with 502, and moves to operation 504. Operation 504 depicts receiving user data at a first user interface that is indicative of interacting with a first graph visual representation of data of a first data store, wherein the first graph visual representation is presented in the first user interface. In some examples, operation 504 can be implemented in a similar manner as operations 404-406 of FIG. 4.

After operation 504, process flow 500 moves to operation 506.

Operation 506 depicts determining graph metadata for the data of the first data store from the user data. In some examples, operation 506 can be implemented in a similar manner as operations 408 of FIG. 4.

After operation 506, process flow 500 moves to operation 508.

Operation 508 depicts storing the graph metadata in a second data store. In some examples, operation 508 can be implemented in a similar manner as operation 410 of FIG. 4.

In some examples, operation 508 comprises creating a schema model for the second data store, wherein the schema model identifies data entities of the first data store and relations between respective data entries of the first data store, and wherein the graph metadata is stored in the second data store according to the schema model. That is, operation 508 can be implemented in a similar manner as process flow 800 of FIG. 8.

In some examples, the user data is indicative of interacting with a first data entity or a first relation, and storing the graph metadata in the second data store comprises storing the graph metadata in a location of the second data store that corresponds to a portion of the schema model that corresponds to the first data entity or the first relation. That is, the two databases can be connected, where entities of the first database are used to create a schema for the second database, and where data is stored in the second database based on corresponding data access in the first database.

In some examples, the first data store comprises a first schema model, the schema model is a second schema model, and operation 508 comprises creating the first schema model for the first data store, wherein the data is stored in the first data store according to the first schema model. That is, a schema can be created for the first database, such as database 1 108 of FIG. 1.

In some examples, operation 508 comprises, in response to creating a new data entity or a new relation in the first data store, updating the schema model based on the new data entity or the new relation to produce an updated schema model for the second data store. That is, where a new entity or relation is created in the first database, the schema for the second database can be updated to reflect this change in the first database.

In some examples, the first data store stores the data according to a first schema, wherein the second data store stores the graph metadata according to a second schema, and wherein the first schema differs from the second schema. That is, the two databases can utilize different schemas.

After operation 508, process flow 500 moves to operation 510.

Operation 510 depicts determining a second graph visual representation that comprises a combination of the data of the first data store and the graph metadata of the second data store. In some examples, operation 510 can be implemented in a similar manner as operation 412 of FIG. 4.

After operation 510, process flow 500 moves to operation 512.

Operation 512 depicts presenting the second graph visual representation in a second user interface, wherein the second user interface comprises the first user interface or another user interface other than the first user interface. In some examples, operation 512 can be implemented in a similar manner as operation 414 of FIG. 4.

In some examples, the first data store comprises a first schema model, the schema model is a second schema model, and operation 512 comprises creating the first schema model for the first data store, wherein the data is stored in the first data store according to the first schema model. That is, a schema can be created for the first database, such as database 1 108 of FIG. 1.

In some examples, operation 512 comprises, in response to creating a new data entity or a new relation in the first data store, updating the schema model based on the new data entity or the new relation to produce an updated schema model for the second data store. That is, where a new entity or relation is created in the first database, the schema for the second database can be updated to reflect this change in the first database.

In some examples, the first data store stores the data according to a first schema, wherein the second data store stores the graph metadata according to a second schema, and wherein the first schema differs from the second schema. That is, the two databases can utilize different schemas.

In some examples, operation 512 comprises, in response to receiving second user data indicative of editing an entity of the data, updating the first schema based on the second user data, and updating the second schema based on the second user data. That is, operation 512 can be implemented in a similar manner as process flow 700 of FIG. 7.

After operation 512, process flow 500 moves to 514, where process flow 500 ends.

FIG. 6 illustrates another example process flow 600 that can facilitate metadata for graph connected databases, in accordance with an embodiment of this disclosure. In some examples, one or more embodiments of process flow 600 can be implemented by metadata for graph connected databases component 110 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, and/or process flow 900 of FIG. 9.

Process flow 600 begins with 602, and moves to operation 604. Operation 604 depicts receiving user data at a first user interface that is indicative of interacting with a first graph visual representation of data of a first database, wherein the first graph visual representation is presented in the first user interface. In some examples, operation 604 can be implemented in a similar manner as operations 404-406 of FIG. 4.

In some examples, the data represents nodes of a first graph and edges of the first graph. That is, the data can have a schema that maps to the first graph and is based on the entities of the first graph.

After operation 604, process flow 600 moves to operation 606.

Operation 606 depicts storing graph metadata in a second database, wherein the graph metadata is determined from the user data, and wherein the graph metadata corresponds to graph metadata of the first database. In some examples, operation 606 can be implemented in a similar manner as operations 408-410 of FIG. 4.

In some examples, the graph metadata indicates a user account associated with creating an entity of the data. That is, the graph metadata can be similar to entity 210 of FIG. 2.

In some examples, the graph metadata indicates a user account associated with updating an entity of the data. That is, the graph metadata can be similar to entity 216 of FIG. 2.

In some examples, the graph metadata indicates a domain associated with an entity of the data. That is, the graph metadata can be similar to entity 212 of FIG. 2.

In some examples, the graph metadata indicates a source of data associated with an entity of the data. That is, the graph metadata can be similar to entity 208 of FIG. 2.

After operation 606, process flow 600 moves to operation 608.

Operation 608 depicts determining a second graph visual representation that comprises a combination of the data of the first database and the graph metadata of the second database. In some examples, operation 608 can be implemented in a similar manner as operation 412 of FIG. 4.

After operation 608, process flow 600 moves to operation 610.

Operation 610 depicts presenting the second graph visual representation in a second user interface, wherein the second user interface comprises the first user interface or another user interface. In some examples, operation 610 can be implemented in a similar manner as operation 414 of FIG. 4.

After operation 610, process flow 600 moves to 612, where process flow 600 ends.

FIG. 7 illustrates another example process flow 700 that can facilitate metadata for graph connected databases, in accordance with an embodiment of this disclosure. In some examples, one or more embodiments of process flow 700 can be implemented by metadata for graph connected databases component 110 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, and/or process flow 900 of FIG. 9.

Process flow 700 begins with 702, and moves to operation 704. Operation 704 depicts, in response to receiving user data indicative of editing an entity of the data, updating an entity nested schema model of a first database based on the user data. That is, create/update entity schema 306 of FIG. 3 can update a schema for data API server schema 310.

After operation 704, process flow 700 moves to operation 706.

Operation 706 depicts updating an anthological schema model for a second database based on the second user data. That is, create/update entity schema 306 of FIG. 3 can update a schema for graph schema (data model) 308. In this manner, one user interaction of interacting with data can be used to update a schema for both database 1 108 and database 2 112 of FIG. 1.

After operation 706, process flow 700 moves to 708, where process flow 700 ends.

FIG. 8 illustrates another example process flow 800 that can facilitate metadata for graph connected databases, in accordance with an embodiment of this disclosure. In some examples, one or more embodiments of process flow 800 can be implemented by metadata for graph connected databases component 110 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, and/or process flow 900 of FIG. 9.

Process flow 800 begins with 802, and moves to operation 804. Operation 804 depicts creating an anthological schema model for a second database, wherein the anthological schema model identifies data entities of a first database and relations between respective data entries of the first database. That is, create/update entity schema 306 of FIG. 3 can create an anthological schema model for graph schema (data model) 308 that describes data entities (of database 1 108 of FIG. 1) and relations and how they are interconnected.

After operation 804, process flow 800 moves to operation 806.

Operation 806 depicts storing the graph metadata in the second database according to the anthological schema model. That is, once this anthological schema model is created, data can be stored in database 2 112 of FIG. 1 according to that model.

In some examples, the user data is indicative of interacting with a first data entity or a first relation, and wherein storing the graph metadata in the second database comprises storing the graph metadata in a location of the second database that corresponds to a portion of the anthological schema model that corresponds to the first data entity or the first relation. That is, where the user accesses a first data entity in the first database (e.g., database 1 108 of FIG. 1), then metadata about that access is stored in the second database (e.g., database 2 112) in a portion of that second database that corresponds to the data entity.

After operation 806, process flow 800 moves to 808, where process flow 800 ends.

FIG. 9 illustrates another example process flow 900 that can facilitate metadata for graph connected databases, in accordance with an embodiment of this disclosure. In some examples, one or more embodiments of process flow 900 can be implemented by metadata for graph connected databases component 110 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, and/or process flow 800 of FIG. 8

Process flow 900 begins with 902, and moves to operation 904. Operation 904 depicts creating an entity nested schema model for a first database. That is, an entity nested data API server schema and resolvers can be created to enable consumption of entity information. That is, create/update entity schema 306 of FIG. 3 can create a nested entity schema model for data API server schema 310 for storing entities and relations that indicate how the entities are interconnected.

After operation 904, process flow 900 moves to operation 906.

Operation 906 depicts storing data in the first database according to the entity nested schema model. That is, once this entity nested schema model is created, data can be stored in database 1 108 of FIG. 1 according to that model.

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of user computer 102 or metadata for graph connected databases system 106 of FIG. 1.

In some examples, computing environment 1000 can implement one or more embodiments of the process flows of FIGS. 4-9 to facilitate metadata for graph connected databases.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

creating an anthological schema model for a second database, wherein the anthological schema model identifies data entities of a first database and relations between respective data entries of the first database, wherein first graph metadata for the first database is stored in the second database according to the anthological schema model, and wherein the second database is configured to store the first graph metadata for the first database independently of an implementation of the first database;

after creating the anthological schema model, creating an entity nested schema model for the first database, wherein the data is stored in the first database according to the entity nested schema model, and creating a contract between a front end of the second database and the second database, wherein the contract is based on an entity-nested data application programming interface server schema and a resolver that are configured to facilitate consumption of entity information of the second database;

presenting a first graph visual representation of data of the first database in a first user interface;

receiving user data at the first user interface that is indicative of interacting with the first graph visual representation of the data, wherein the interacting comprises user input to the first graph visual representation of the data that is indicative of updating or creating a node or entity of the data to produce an updated graph, and wherein the user input data is expressed independently of the implementation of the first database;

based on the user input, both updating the first database with the updated graph, and updating the second database with second graph metadata, wherein the second graph metadata is based on the updating or the creating of the node or the entity of the data and wherein the first database is separate from the second database;

determining a second graph visual representation that comprises a combination of the data of the first database and the second graph metadata of the second database; and presenting the second graph visual representation in a second user interface, wherein the second user interface comprises the first user interface or another user interface other than the first user interface.

2. The system of claim 1, wherein the user data at the first user interface that is indicative of interacting with the first graph visual representation comprises user data indicative of creating an entry the data, updating the entry in the data, or exploring the data, and wherein the entry comprises a node or an edge that connects two nodes.

3. The system of claim 1, wherein the first database is configured to be accessed via a first protocol for querying and manipulating data, wherein the second database is configured to be accessed via a second protocol, and wherein the first protocol differs from the second protocol.

4. The system of claim 1, wherein the user data is first user data, and wherein the operations further comprise:

in response to receiving second user data indicative of editing an entity of the data, updating both the entity nested schema model of the first database, and the anthological schema model for the second database, based on the second user data.

5. The system of claim 1, wherein the user data is indicative of interacting with a first data entity or a first relation, and wherein storing the second graph metadata in the second database comprises storing the second graph metadata in a location of the second database that corresponds to a portion of the anthological schema model that corresponds to the first data entity or the first relation.

6. The system of claim 1, wherein the operations further comprise:

in response to creating, by the system, a new data entity or a new relation in the first database, updating the second schema model based on the new data entity or the new relation to produce an updated second schema model for the second database.

7. A method, comprising:

creating, by a system comprising at least one processor, a second schema model for a second data store, wherein the second schema model identifies data entities of a first data store and relations between respective data entries of the first data store, wherein first graph metadata of the first data store is stored in the second data store according to the second schema model, and wherein the second data store is configured to store the first graph metadata for the first data store independently of an implementation of the first data store;

after creating the second schema model, creating, by the system, a first schema model for the first data store, wherein the data is stored in the first data store according to the first schema model, and creating, by the system, a contract between a front end of the second database and the second database, wherein the contract is based on an entity-nested data application programming interface server schema and a resolver that are configured to facilitate consumption of entity information of the second database;

receiving, by the system, user data at a first user interface that is indicative of interacting with a first graph visual representation of data of the first data store, wherein the first graph visual representation is presented in the first user interface, wherein the interacting comprises user input to the first graph visual representation of the data that is indicative of updating or creating a node or entity of the first data store to produce an updated graph, and wherein the user input data indicates the updating or the creating of the node or the entity of the first data store independently of the implementation of the first database;

determining, by the system, second graph metadata for the data of the first data store from the user data, wherein the second graph metadata is based on the updating or the creating of the node or the entity of the first data store;

based on the user data, storing, by the system, the updated graph in the first data store, and storing, by the system, the second graph metadata in the second data store;

determining, by the system, a second graph visual representation that comprises a combination of the data of the first data store and the second graph metadata of the second data store; and presenting, by the system, the second graph visual representation in a second user interface, wherein the second user interface comprises the first user interface or another user interface other than the first user interface.

8. The method of claim 7, wherein the user data is indicative of interacting with a first data entity or a first relation, and wherein storing the second graph metadata in the second data store comprises storing the second graph metadata in a location of the second data store that corresponds to a portion of the second schema model that corresponds to the first data entity or the first relation.

9. The method of claim 7, further comprising:

in response to creating, by the system, a new data entity or a new relation in the first data store, updating the second schema model based on the new data entity or the new relation to produce an updated second schema model for the second data store.

10. The method of claim 7, wherein the first schema model to a first schema, wherein the second schema model corresponds to a second schema, and wherein the first schema differs from the second schema.

11. The method of claim 10, wherein the user data is first user data, and further comprising:

in response to receiving second user data indicative of editing an entity of the data, updating, by the system, the second schema based on the second user data; and updating, by the system, the first schema based on the second user data.

12. The method of claim 7, wherein the user data at the first user interface that is indicative of interacting with the first graph visual representation comprises user data indicative of creating an entry the data, updating the entry in the data, or exploring the data, and wherein the entry comprises a node or an edge that connects two nodes.

13. The method of claim 7, wherein the first data store is configured to be accessed via a first protocol for querying and manipulating data, wherein the second data store is configured to be accessed via a second protocol, and wherein the first protocol differs from the second protocol.

14. A non-transitory computer-readable medium comprising instructions that, in response to execution, cause a system comprising at least one processor to perform operations, comprising:

creating a second schema model for a second database, wherein the second schema model identifies data entities of a first database and relations between respective data entries of the first database, wherein first graph metadata of the first database is stored in the second database according to the second schema model, and wherein the second database is configured to store the first graph metadata for the first database independently of an implementation of the first database;

after creating the second schema model, creating a first schema model for the first database, wherein the data is stored in the first database according to the first schema model, and creating a contract between a front end of the second database and the second database, wherein the contract is based on an entity-nested data application programming interface server schema and a resolver that are configured to facilitate consumption of entity information of the second database;

receiving user data at a first user interface that is indicative of interacting with a first graph visual representation of data of the first database, wherein the first graph visual representation is presented in the first user interface, wherein the interacting comprises user input to the first graph visual representation of the data that is indicative of updating or creating a node or entity of the data of the first database to produce an updated graph, and wherein the user input data indicates the updating or the creating of the node or the entity of the data of the first database independently of the implementation of the first database;

based on the user data, updating the first database with the updated graph, and updating the second database with second graph metadata, wherein the second graph metadata is determined from the user data, and wherein the second graph metadata corresponds to the first database, wherein the second graph metadata is based on the updating or the creating of the node or the entity of the data;

determining a second graph visual representation that comprises a combination of the data of the first database and the second graph metadata of the second database; and presenting the second graph visual representation in a second user interface, wherein the second user interface comprises the first user interface or another user interface.

15. The non-transitory computer-readable medium of claim 14, wherein the second graph metadata indicates a user account associated with creating an entity of the data.

16. The non-transitory computer-readable medium of claim 14, wherein the second graph metadata indicates a user account associated with updating an entity of the data.

17. The non-transitory computer-readable medium of claim 14, wherein the second graph metadata indicates a domain associated with an entity of the data.

18. The non-transitory computer-readable medium of claim 14, wherein the second graph metadata indicates a source of data associated with an entity of the data.

19. The non-transitory computer-readable medium of claim 14, wherein the data represents nodes of a first graph and edges of the first graph.

20. The non-transitory computer-readable medium of claim 14, wherein the user data at the first user interface that is indicative of interacting with the first graph visual representation comprises user data indicative of creating an entry the data, updating the entry in the data, or exploring the data, and wherein the entry comprises a node or an edge that connects two nodes.

* * * * *